United States Patent
Kim

(10) Patent No.: US 12,415,498 B2
(45) Date of Patent: Sep. 16, 2025

(54) HYBRID ENGINE SYSTEM AND METHOD OF CONTROLLING THE SAME

(71) Applicant: KOREA AEROSPACE RESEARCH INSTITUTE, Daejeon (KR)

(72) Inventor: Chun Taek Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 323 days.

(21) Appl. No.: 18/315,756

(22) Filed: May 11, 2023

(65) Prior Publication Data

US 2024/0067154 A1     Feb. 29, 2024

(30) Foreign Application Priority Data

Jun. 21, 2022 (KR) .................. 10-2022-0075687

(51) Int. Cl.
*B60W 10/06* (2006.01)
*B60W 10/08* (2006.01)
*B60W 10/26* (2006.01)

(52) U.S. Cl.
CPC ............ *B60W 10/08* (2013.01); *B60W 10/06* (2013.01); *B60W 10/26* (2013.01); *B60W 2710/0666* (2013.01)

(58) Field of Classification Search
CPC ...... B60W 10/06; B60W 10/08; B60W 10/26; B60W 2710/0666
See application file for complete search history.

(56) References Cited

U.S. PATENT DOCUMENTS

| | | | | |
|---|---|---|---|---|
| 8,875,519 | B2 * | 11/2014 | Dooley | F02C 7/32 60/778 |
| 10,112,723 | B2 | 10/2018 | Rossotto et al. | |
| 2013/0291830 | A1 * | 11/2013 | Doering | B60W 20/40 123/350 |
| 2022/0135018 | A1 * | 5/2022 | Sheidler | B60K 6/485 56/10.2 A |
| 2022/0290606 | A1 | 9/2022 | Matsumoto et al. | |

FOREIGN PATENT DOCUMENTS

| | | | |
|---|---|---|---|
| EP | 3613674 | 2/2020 | |
| JP | 2000097063 | 4/2000 | |
| JP | 4108450 B2 * | 6/2008 | ............ B64C 27/04 |
| JP | 2022137452 | 9/2022 | |
| KR | 20170018671 | 2/2017 | |

\* cited by examiner

*Primary Examiner* — Edwin A Young
(74) *Attorney, Agent, or Firm* — Perman & Green, LLP

(57) ABSTRACT

A hybrid engine system includes: an engine; a generator driven by the engine to output electrical energy; a battery configured to store electrical energy produced by the generator or supply electrical energy together with the generator; and a controller configured to control the engine, wherein the controller includes a torque meter for measuring torque of an output shaft of the engine and a current meter for measuring output current of the generator, and is further configured to change a control mode of the engine when a reduction rate of at least one of the torque and the current is greater than a set value while the engine is operating in a fly mode.

12 Claims, 4 Drawing Sheets

HYBRID ENGINE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2022-0075687, filed on Jun. 21, 2022, in the Korean Intellectual Property Office, the disclosure of which is incorporated by reference herein in its entirety.

BACKGROUND

1. Field

The disclosure relates to a hybrid engine system using a battery as an additional power source and a method of controlling the hybrid engine system.

2. Description of the Related Art

In the case of drones operated only by batteries, the maximum flying time is limited to several tens of minutes. For this reason, hybrid drones are used for urban air mobility (UAM), and hybrid engines using turboshaft engines are mainly used when the aircraft weight and pay load are relatively large.

A turboshaft engine is mainly used as an engine for helicopters. Because the shaft of the turboshaft engine is connected to the rotor of a helicopter, the moment of inertia is large, and thus, a change in the number of rotations of the engine is not large and a rapid change in the number of rotations does not occur. On the other hand, in the case of a turboshaft hybrid engine, a generator is connected to the turboshaft. The generator has a much smaller moment of inertia than the rotor of a helicopter, and thus, a large change in the number of rotations occurs when a generator load rapidly changes. In particular, when the generator load is rapidly reduced, such as when the generator malfunctions or when the propeller or motor malfunctions, the shaft of the turboshaft engine leads to an overspeed in the rotational speed, and in severe cases, the engine may be damaged. This case corresponds to a case of exceeding the control limit of an engine controller.

The description above is technical information that the inventor had for deriving the inventive concept or was acquired while deriving the inventive concept, and may not be known to the public prior to the filling of the present application.

Prior Art Documents (Patent Document 1) Korean Patent Publication No. 10-2017-0018671 A1

SUMMARY

Provided are a hybrid engine system capable of protecting an engine from overspeeding when the load of a generator rapidly decreases, and a method of controlling the hybrid engine system.

Embodiments set forth herein are examples, and the disclosure is not limited thereto.

Additional aspects will be set forth in part in the description which follows and, in part, will be apparent from the description, or may be learned by practice of the presented embodiments of the disclosure.

One or more embodiments of the disclosure provide the following hybrid engine system and a method of controlling the hybrid engine system.

According to one or more embodiments, the hybrid engine system includes: an engine; a generator driven by the engine to output electrical energy; a battery configured to store the electrical energy produced by the generator or supply the electrical energy together with the generator; and a controller configured to control the engine, wherein the controller includes a torque meter for measuring a torque of an output shaft of the engine and a current meter for measuring output a current of the generator, and the controller is further configured to change a control mode of the engine when a reduction rate of at least one of the torque and the current is greater than a set value while the engine is operating in a fly mode.

The controller may be further configured to drive the engine in a stop mode in which the engine is stopped for a set time when a reduction rate of the torque is greater than a first torque reduction rate or a reduction rate of the current is greater than a first current reduction rate.

The controller may be further configured to idle the engine after the set time has elapsed in the stop mode and then drive the engine in the fly mode.

The controller may be further configured to drive the engine in an idle mode in which the engine is idled for a set time when a reduction rate of the torque is greater than a second torque reduction rate or a reduction rate of the current is greater than a second current reduction rate.

The controller may be further configured to drive the engine in a deceleration rate control mode in which a set value of the maximum deceleration rate of the engine is increased when a reduction rate of the torque is greater than a second torque reduction rate or a reduction rate of the current is greater than a second current reduction rate.

According to one or more embodiments, the method of controlling a hybrid engine system includes: a fly mode driving operation of driving an engine in a fly mode; a reduction rate determination operation of measuring torque of an output shaft of the engine and output current of a generator connected to the output shaft of the engine and comparing a reduction rate of the torque and a reduction rate of the current with a set value; and a mode change operation of changing a control mode of the engine according to the reduction rate determination operation.

The reduction rate determining operation may include a first reduction rate determination operation of comparing the reduction rate of the torque with a first torque reduction rate and comparing the reduction rate of the current with a first current reduction rate, wherein, when the reduction rate of the torque is greater than the first torque reduction rate or the reduction rate of the current is greater than the first current reduction rate, the control mode may be changed, in the mode change operation, to a stop mode in which the engine is stopped for a set time.

The engine may be idled after the set time has elapsed in the stop mode and then may be driven in the fly mode.

The reduction rate determination operation may include a second reduction rate determination operation of comparing the reduction rate of the torque with a second torque reduction rate and comparing the reduction rate of the current with a second current reduction rate, wherein, when the reduction rate of the torque is greater than the second torque reduction rate or the reduction rate of the current is greater than the second current reduction rate, the control mode may be changed, in the mode change operation, to an idle mode in which the engine is idled for a set time.

The reduction rate determination operation may include a second reduction rate determination operation of comparing the reduction rate of the torque with a second torque reduction rate and comparing the reduction rate of the current with a second current reduction rate, wherein, when the reduction rate of the torque is greater than the second torque reduction rate or the reduction rate of the current is greater than the second current reduction rate, the control mode may be changed to a deceleration rate control mode for increasing a set value of the maximum deceleration rate of the engine.

The reduction rate determination operation may include a second reduction rate determination operation of comparing the reduction rate of the torque with a second torque reduction rate and the reduction rate of the current with a second current reduction rate when, in the first reduction rate determination operation, the reduction rate of the torque is not greater than the first torque reduction rate and the reduction rate of the current is not greater than the first current reduction rate, wherein, when the reduction rate of the torque is greater than the second torque reduction rate or the reduction rate of the current is greater than the second current reduction rate, the control mode may be changed to a deceleration rate control mode in which a set value of the maximum deceleration rate of the engine is increased.

Other aspects, features, and advantages will become apparent and more readily appreciated from the accompanying drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
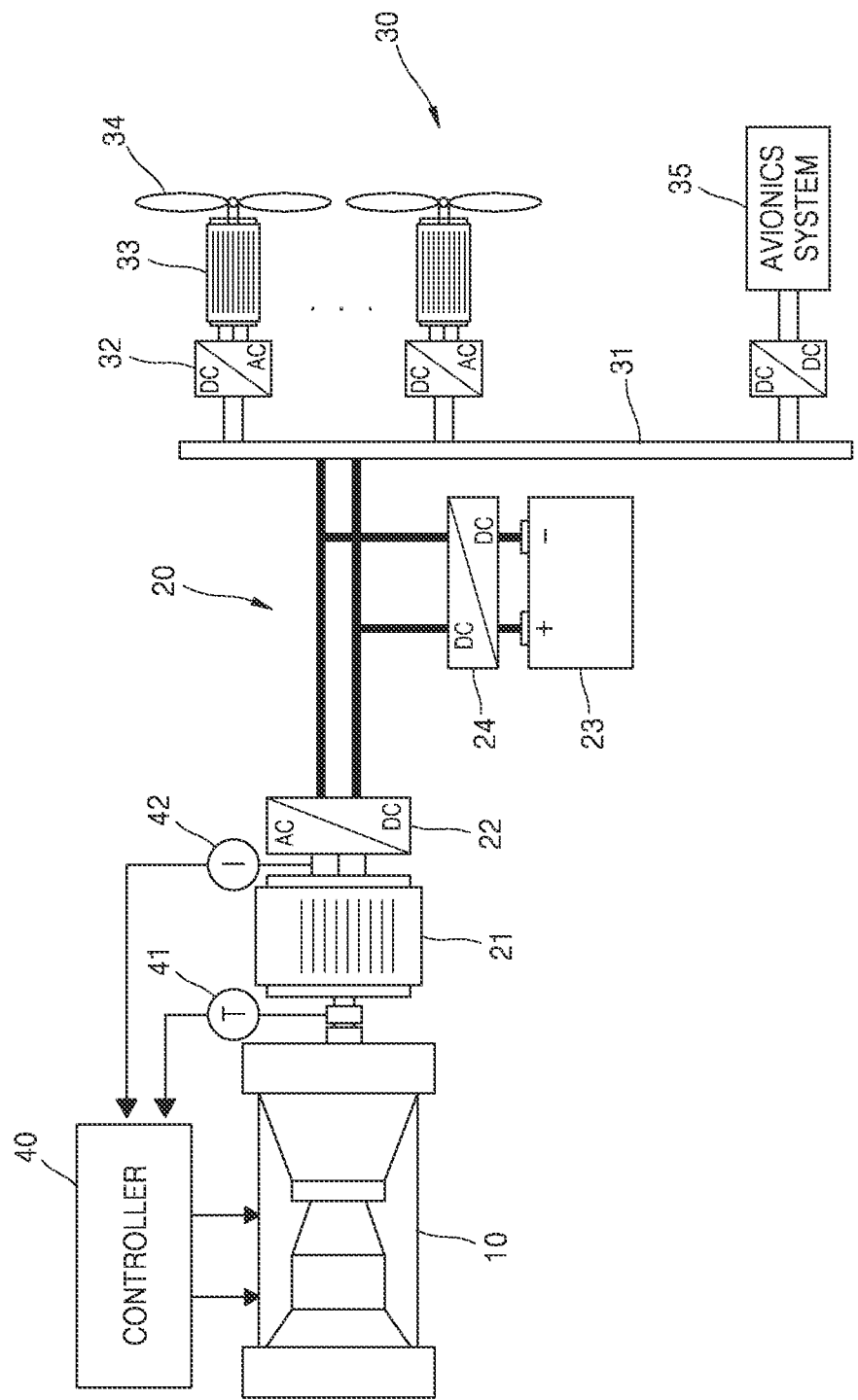
FIG. 1 is a view schematically illustrating a hybrid engine system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure may have various different forms and various embodiments, and specific embodiments are described with reference to the accompanying drawings. However, the disclosure is not limited to the specific embodiments, and it should be understood that the idea and technical scope of the embodiments cover all the modifications, equivalents, and replacements. In the descriptions of embodiments, like reference numerals denote like elements.

Hereinafter, embodiments will be described with reference to the accompanying drawings. In the drawings, like reference numerals denote like elements, and overlapping descriptions thereof will be omitted.

In the following descriptions of the embodiments, although terms such as "first" and "second" are used to describe various elements, these elements should not be limited by these terms. These terms are only used to distinguish one element from another element.

The terms of a singular form may include plural forms unless otherwise mentioned.

It will be further understood that the terms "includes", "has", "including", and/or "having" used herein specify the presence of stated features or elements, but do not preclude the presence or addition of one or more other features or elements.

Sizes of elements in the drawings may be exaggerated for ease of explanation. In other words, sizes and thicknesses of elements in the drawings are arbitrarily illustrated for ease of explanation, and thus the following embodiments are not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment is implemented differently, a specific process order may be performed differently from the described order. For example, two consecutively described processes may be performed substantially at the same time or performed in an order opposite to the described order.

In the following description, the technical terms are used only for explaining a specific embodiment while not limiting the disclosure. The term "include", "have", or "comprise" used herein specifies the presence of a property, a fixed number, a step, a process, an element, a component, and a combination thereof, but does not exclude the presence or addition of other properties, fixed numbers, steps, processes, elements, components, and combinations thereof.

Hereinafter, specific embodiments of the disclosure will be described in detail with reference to the drawings.

FIG. 1 is a view schematically illustrating a hybrid engine system according to an embodiment. As shown in FIG. 1, the hybrid engine system according to the present embodiment may include an engine 10, a generator 21 driven by the engine 10 to output electrical energy, a battery 23 that stores the electrical energy generated by the generator 21 or supplies electrical energy together with the generator 21, and a controller 40 that controls the engine 10.

The engine 10 may include a turbine and output fuel energy as rotational energy of the turbine, and a turboshaft engine mainly used in a helicopter may be exemplified as a representative example of the engine 10. In addition, all engines having a structure in which a turbine rotates, for example, a turbojet engine, a turbofan engine, a turboprop engine, a pulse jet engine, a ramjet engine, and a rocket engine, may be applied to the engine 10.

Rotational energy of the engine 10 may be transmitted to a load 30 consuming power through a power transmitter 20 including the generator 21 and the like. The generator 21 may be connected to the output shaft of the engine 10 to receive torque. The generator 21 may convert rotational energy received from the engine 10 into electrical energy generated as AC voltage and AC current by electromagnetic induction and output the electrical energy. In general, because generation current converted using a power converter contains many harmonics, the harmonics of the generation current may be removed using a hardware filter.

In addition, the power transmitter 20 may include a first converter 22 connected to the output terminal of the generator 21. The first converter 22 may be an AC/DC converter and convert AC power output from the generator 21 into DC power. In one system, the first converter 22 integrates a DC power of the battery 23 and an AC power output from the generator 21. In addition, the first converter 22 may be used to raise or lower a voltage to a level suitable for the system.

In addition, the power transmitter 20 may include the battery 23 and a second converter 24 that is a DC/DC converter for boosting or stepping down the voltage of the battery 23. The battery 23 is a component that supplies power together with the engine 10 and the generator 21, and in particular, when energy supplied from the engine 10 is insufficient, power from the battery 23 may be used. In addition, when electrical energy output from the generator 21 is greater than a required amount, the electrical energy may be stored in the battery 23. The battery 23 may be composed of a secondary battery. An example of the battery 23 is a lithium polymer battery 23. In the hybrid engine system, a prop rotor 34, an avionics system 35, or the like may be driven by using electrical energy produced by the generator 21 and electrical energy stored in the battery 23 as power sources.

Power of the power transmitter 20 may be transmitted to the load 30. When a node formed between the power transmitter 20 and the load 30 is referred to as a power receiving node 31, a plurality of loads may be connected to the power receiving node 31. A third converter 32 may be installed at the front end of the load, and depending on the type of load, the third converter 32 may be configured as a DC/AC converter, in which case DC power may be converted. Alternatively, the third converter 32 may be configured as a DC/DC converter, and in this case, the DC voltage may be boosted or stepped down.

For example, in the case of a drone, the load 30 may include a motor 33 and a prop motor 34, and in this case, a DC/AC converter may be used as the third converter 32. In addition, a DC/DC converter may be used in front of other avionics systems 35 such as controllers and lamps so that the third converter 32 is adjusted according to a rated voltage of a corresponding load. In addition, a plurality of converters may be connected in series.

The controller 40 according to the present embodiment is a component for controlling the engine 10. For control, the controller 40 may include a torque meter 41 for measuring a torque T of the output shaft of the engine 10 and a current meter 42 for measuring an output current I of the generator 21. This is to take advantage of the fact that, when the load of the generator 21 rapidly decreases, the torque or current rapidly decreases and the power of the engine 10 is temporarily constant, and thus, over-rotation of the engine 10 may be expected through this. Furthermore, the rate of change per time (t) of each of the measured torque and the measured current may be calculated, and a torque reduction rate ($-\Delta T/\Delta t$) (i.e., a reduction rate of the torque) and a current reduction rate ($-\Delta I/\Delta t$) (i.e., a reduction rate of the current) may be compared with a set value. In this case, while the engine 10 is operating in a fly mode, when a reduction rate of at least one of the torque value and the current value is greater than the set value, the driving mode of the engine 10 may be changed. Here, the (−) included in the reduction rate is to indicate the decrease as a positive number. Both the torque reduction rate and the current reduction rate may be used for control accuracy, or only one of the torque reduction rate and the current reduction rate may be used in cases where high reliability is relatively less required, such as in an unmanned drone.

Prior to explaining the control configuration of the engine 10 of the controller 40 in detail, the control mode of the engine 10 will be described. In an embodiment, the control mode of the engine 10 may include a fly mode, a stop mode, an idle mode, and a deceleration rate control mode. Here, it may be understood that the fly mode and the idle mode control driving of the engine 10 itself and the deceleration rate control mode controls a value set in a controller for controlling the engine 10.

First, the fly mode means that the engine 10 is driven in a normal flight state. In this case, the case where the load of the generator 21 suddenly changes is excluded as it is not considered a normal flight state. Power is generated from the generator 21 by driving the engine 10 in the fly mode, and power from the battery 23 may be used in addition to the power from the generator 21 as needed. In addition, the maximum deceleration rate of the engine 10 in the fly mode may be stored in the controller 40 as a set value. The maximum deceleration rate of the engine 10 may be set constant regardless of the mode. The maximum deceleration rate ($\text{Max}(-\Delta \dot{m}_f/\Delta t)$) engine 10 may be defined as N (normal) as follows. N may be formed as a positive number or a function mediated by another parameter. The (−) included in the maximum deceleration rate is to indicate the decrease as a positive number.

$$\text{Max}\left(-\frac{\Delta \dot{m}_f}{\Delta t}\right) = \text{Normal}$$

Here, t denotes time, and $\dot{m}_f$ may be understood as a factor that decelerates the engine 10. As an example of the factor, $\dot{m}_f$ may be a fuel flow rate supplied to the engine 10 and in this case. $-\Delta \dot{m}_f$ may be a reduced amount of the fuel flow rate.

The stop mode is a control mode of the engine 10 in the case where the load of the generator 21 rapidly decreases. In the stop mode, the engine 10 stops and may stand by in a stop state for a set time. That is, the engine 10 may be stopped for a set time. Furthermore, the stop mode is a mode in which the engine 10 is driven in an idle state after the set time has elapsed and is converted to a fly mode.

The idle state denotes a state of the engine 10 when no rotation is output contrary to a state when the engine 10 is operating. Theoretically, it means that the output is 0, and it may be understood that there is no effective engine output. In this case, the effective engine output may be understood as an output required for driving. In the present embodiment, the output driving the generator 21 may be regarded as the effective engine output. In addition, even though the engine 10 is driven in idle mode, the stability of mobility to which the present embodiment is applied may be maintained because the battery 23 provides power. For example, even though the engine 10 is driven in idle mode during drone flight, the prop rotor 34 may be driven with the power of the battery 23, and thus, there is no safety problem.

Next, the idle mode is a control mode of the engine 10 when the load of the generator 21 decreases rapidly. Specifically, the idle mode may correspond to a case in which the load of the generator 21 does not decrease rapidly compared to the case of the stop mode, but decreases faster than a normal range. In the idle mode, the controller 40 may drive the engine 10 in an idle state for a set time and then switch to the fly mode. That is, the engine 10 may be switched to the fly mode after waiting for a set time in the idle state.

Finally, the deceleration rate control mode is a control mode of the engine 10 when the load of the generator 21 decreases rapidly. Specifically, the deceleration rate control mode may correspond to a case in which the load of the generator 21 does not decrease rapidly compared to the case of the stop mode, but decreases faster than a normal range. In the deceleration rate control mode, the controller 40 may increase the stored maximum deceleration rate (Max(−Δṁ$_f$/Δt)) of the engine 10 from N (Normal) as follows.

$$\text{Max}\left(-\frac{\Delta \dot{m}_f}{\Delta t}\right) = \text{Normal} + \alpha$$

Here, α is a positive number, and therefore, the maximum deceleration rate of the engine 10 in the deceleration rate control mode has a larger value than in other modes. For example, ṁ$_f$ may be a fuel flow rate supplied to the engine 10, and in this case, −Δṁ$_f$ may be a reduced amount of the fuel flow rate.

In the case of the existing engine, because a controller performs control by receiving only the number of rotations of the engine as feedback, it is inevitable to respond only after over-rotation of the engine has already occurred according to the characteristics of feedback control. That is, there is a problem in that over-rotation of the engine may not be prevented. Unlike this, the disclosure has an effect in that it is possible to predict and respond to over-rotation of the engine 10 by performing feed forward control.

The controller 40 may compare a torque reduction rate (−ΔT/Δt) and a current reduction rate (−Δt/Δt) with a set value and change the control mode of the engine 10 when a reduction rate of at least one of the torque and the current is greater than the set value while the engine 10 is operating in a fly mode.

The controller 40 may compare the torque reduction rate (−ΔT/Δt) with a first torque reduction rate (A+A'). Here, A is a critical reduction rate of a set torque, and A' is a reduction rate that is determined within a range, in which the engine 10 is not damaged, and may be additionally added. That is, the first torque reduction rate A+A' is a reduction rate that may decrease more sharply than the critical reduction rate A. In addition, the controller 40 may compare the current reduction rate (−Δt/Δt) with a first current reduction rate (B+B'). Here, B is a critical reduction rate of a set current, and B' is an additional reduction rate that is determined within a range, in which the engine 10 is not damaged, and may be added. That is, the first current reduction rate (B+B') is a reduction rate that may decrease more sharply than the critical reduction rate (B). Subsequently, the controller 40 may drive the engine 10 in a stop mode in which the engine 10 is stopped for a set time when the torque reduction rate (−ΔT/Δt) is greater than the first torque reduction rate (A+A') or the current reduction rate (−Δt/Δt) is greater than the first current reduction rate (B+B'). In addition, as described above, the controller 40 may idle the engine 10 after the set time has elapsed in the stop mode and then drive the engine 10 in the fly mode.

Furthermore, the controller 40 may compare the torque reduction rate (−ΔT/Δt) with a second torque reduction rate (A). Here, the second torque reduction rate (A) may be understood as the critical reduction rate (A) described above. In addition, the controller 40 may compare the current reduction rate (−Δt/Δt) with a second current reduction rate (B). Here, the second current reduction rate (B) may be understood as the critical reduction rate (B) described above. Subsequently, the controller 40 may drive the engine 10 in an idle mode in which the engine 10 is idled for a set time when the torque reduction rate (−ΔT/Δt) is greater than the second torque reduction rate (A) or the current reduction rate (−Δt/Δt) is greater than the second current reduction rate (B).

The controller 40 may drive the engine 10 in a deceleration rate control mode in which a set value of the maximum deceleration rate of the engine 10 is increased when the torque reduction rate (−ΔT/Δt) is greater than the second torque reduction rate (A) or the current reduction rate (−ΔI/Δt) is greater than the second current reduction rate (B).

The controller 40 may selectively apply an idle mode or a deceleration rate control mode, which may be automatically or manually performed. Furthermore, the idle mode and the deceleration rate control mode may be simultaneously applied. However, when the idle mode and the deceleration rate control mode are simultaneously applied, because the deceleration rate control mode is related to a control set value for controlling the engine 10 rather than the engine 10 itself, over-rotation of the engine 10 may be prevented due to the effect of the idle mode before the deceleration rate control mode is applied to take effect.

Hereinafter, a method of controlling a hybrid engine system, according to an embodiment, will be described in detail. Among components described below, components having the same names, symbols, or reference numerals as the components presented in the description of the hybrid engine system may be understood as being the same components and having the same meanings as already described.

Figure 2:
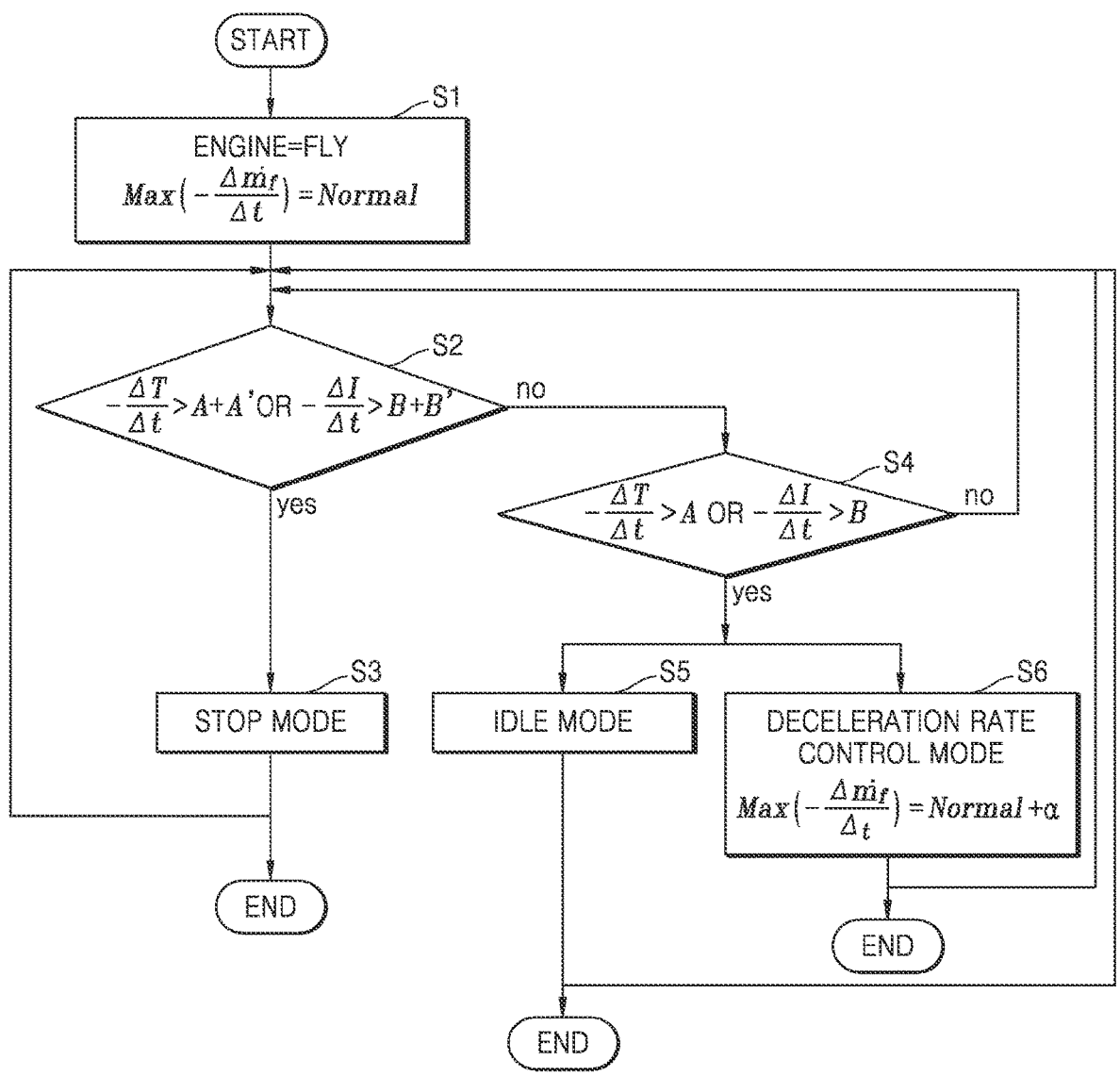
FIG. 2 is a flowchart of a method of controlling a hybrid engine system, according to an embodiment.
Figure 3:
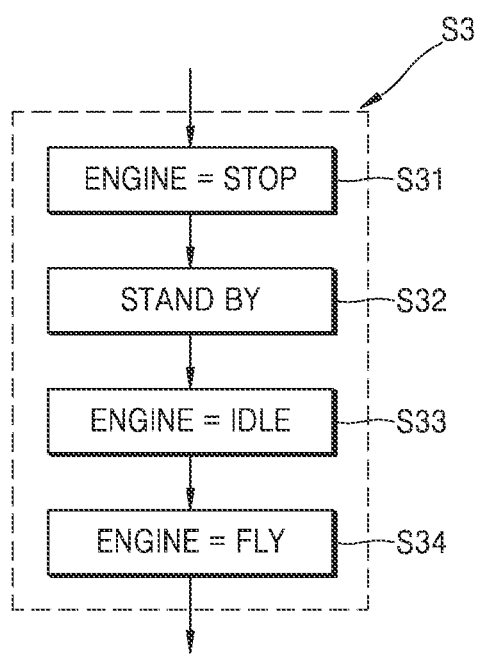
FIG. 3 is a detailed view of a stop mode driving operation in FIG. 2.
Figure 4:
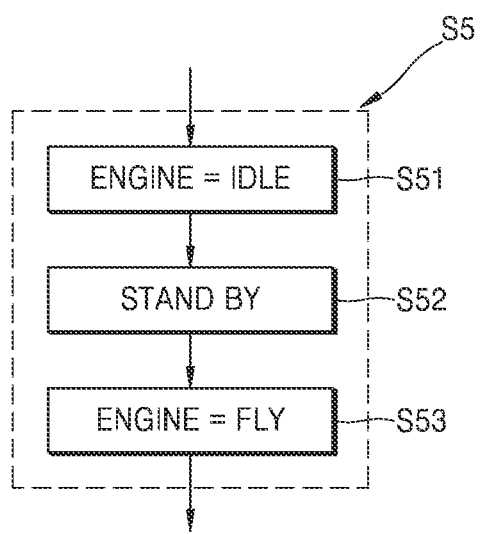
FIG. 4 is a detailed view of an idle mode driving operation in FIG. 2.

FIG. 2 is a flowchart of a method of controlling a hybrid engine system, according to an embodiment, FIG. 3 is a detailed view of a stop mode driving operation in FIG. 2, and FIG. 4 is a detailed view of an idle mode driving operation in FIG. 2. As shown in FIGS. 2 to 4, the method of controlling a hybrid engine system, according to an embodiment, may include a fly mode driving operation S1 of driving the engine 10 in a fly mode, a reduction rate determination operation S2 and S4 of measuring the torque of an output shaft of the engine 10 and the output current of the generator 21 connected to the output shaft of the engine 10 and comparing a reduction rate of the torque and a reduction rate of the current with a set value, and a mode change operation S3, S5, and S6 of changing a control mode of the engine 10 according to the reduction rate determination operation S2 and S4.

In the fly mode driving operation S1, the engine 10 is controlled in the fly mode described above. Referring to FIG. 2, the fly mode driving operation S1 means that the engine 10 is driven in a normal flight state. The case where the load of the generator 21 suddenly changes is considered not a normal flight state and is excluded from the normal flight state. Power is generated from the generator 21 by driving the engine 10 in the fly mode, and power from the battery 23 may be used in addition to the power from the generator 21 as needed. In addition, the maximum deceleration rate of the engine 10 in the fly mode may be stored in the controller 40 as a set value. The maximum deceleration rate of the engine 10 may be set constant regardless of the mode. The maximum deceleration rate (Max(−Δṁ$_f$/Δt)) of the engine 10 may be defined as N (normal) as follows.

$$\text{Max}\left(-\frac{\Delta \dot{m}_f}{\Delta t}\right) = \text{Normal}$$

Here, Normal may be formed as a positive number or a function mediated by another parameter. The (−) included in the maximum deceleration rate is to indicate the decrease as a positive number. Here, t denotes time, and $\dot{m}_f$ may be understood as a factor that decelerates the engine 10. As an example of the factor, $\dot{m}_f$ may be a fuel flow rate supplied to the engine 10 and in this case, $-\Delta\dot{m}_f$ may be a reduced amount of the fuel flow rate.

The reduction rate determination operation S2 and S4 may include a first reduction rate determination operation S2 and a second reduction rate determination operation S4. In the reduction rate determination operation S2 and S4, the torque reduction rate (−ΔT/Δt) and the current reduction rate (−ΔI/Δt) may be compared with a set value. This is to take advantage of the fact that, when the load of the generator 21 rapidly decreases, the torque or current rapidly decreases and the power of the engine 10 is temporarily constant, and thus, over-rotation of the engine 10 may be expected through this. While the engine 10 is operating in a fly mode, when a reduction rate of at least one of the torque value and the current value is greater than the set value, the control mode of the engine 10 may be changed.

The first reduction rate determination operation S2 is an operation of comparing the torque reduction rate (−ΔT/Δt) with the first torque reduction rate (A+A'). Here, A is a critical reduction rate of a set torque, and A' is a reduction rate that is determined within a range, in which the engine 10 is not damaged, and may be additionally added. That is, the first torque reduction rate (A+A') is a reduction rate that may decrease more sharply than the critical reduction rate (A). Also, in the first reduction rate determination operation S2, the current reduction rate (−Δt/Δt) may be compared with the first current reduction rate (B+B'). Here, B is a critical reduction rate of a set current, and B' is an additional reduction rate that is determined within a range, in which the engine 10 is not damaged, and may be added. That is, the first current reduction rate (B+B') is a reduction rate that may decrease more sharply than the critical reduction rate (B). Subsequently, in the first reduction rate determination operation S2, it may be determined whether the torque reduction rate (−ΔT/Δt) is greater than the first torque reduction rate (A+A') or the current reduction rate (−Δt/Δt) is greater than the first current reduction rate (B+B').

When it is determined that the torque reduction rate (−ΔT/Δt) is greater than the first torque reduction rate (A+A') or the current reduction rate (−ΔT/Δt) is greater than the first current reduction rate (B+B'), the control mode of the engine 10 may be changed to a stop mode driving operation S3, which is one of mode changing operations.

As shown in FIGS. 2 and 3, the stop mode driving operation S3 corresponds to a control mode of the engine 10 when the load of the generator 21 is rapidly reduced. In the stop mode, the engine 10 stops (operation S31) and may stand by in a stop state for a set time (operation S32). That is, the engine 10 may be stopped for a set time. Furthermore, in the stop mode, the engine 10 may be driven in an idle state after the set time has elapsed (operation S33), and after the output of the engine 10 increases enough to switch to the fly mode, the control mode of the engine 10 may be switched to the fly mode (operation S34). Subsequently, over-rotation of the engine 10 may be prevented by continuously determining the torque reduction rate and the current reduction rate.

When it is determined, in the first reduction rate determination operation S2, that the torque reduction rate (−ΔT/Δt) is greater than the first torque reduction rate (A+A') or the current reduction rate (−Δt/Δt) is greater than the first current reduction rate (B+B'), the torque reduction rate (−Δt/Δt) may be compared with the second torque reduction rate (A) in the second reduction rate determination operation S4. Here, the second torque reduction rate (A) may be understood as the critical reduction rate (A) described above. In addition, in the second reduction rate determination operation S4, the current reduction rate (−Δ/Δt) may be compared with the second current reduction rate (B). Here, the second current reduction rate (B) may be understood as the critical reduction rate (B) described above. Subsequently, the controller 40 may drive the engine 10 in an idle mode in which the engine 10 is idled for a set time when the torque reduction rate (−ΔT/Δt) is greater than the second torque reduction rate (A) or the current reduction rate (−Δt/Δt) is greater than the second current reduction rate (B).

In the second reduction rate determination operation S4, when it is determined that the torque reduction rate (−ΔT/Δt) is greater than the second torque reduction rate (A) or the current reduction rate (−ΔI/Δt) is greater than the second current reduction rate (B), the control mode of the engine 10 may be changed to an idle mode driving operation S5, which is one of the mode changing operations.

The idle mode driving operation S5 corresponds to a control mode of the engine 10 when the load of the generator 21 rapidly decreases, as shown in FIGS. 2 and 4. Specifically, it may be seen as a case in which the load of the generator 21 does not rapidly decrease compared to the case of the stop mode, but decreases faster than a normal range. After the engine 10 is switched to an idle state in the idle mode (operation S51) and waited for a set time (operation S52), the control mode of the engine 10 may be switched to the fly mode (operation S53). Subsequently, over-rotation of the engine 10 may be prevented by continuously determining the torque reduction rate and the current reduction rate.

In addition, when it is determined, in the second reduction rate determination operation S4, that the torque reduction rate (−ΔT/Δt) is greater than the second torque reduction rate (A) or the current reduction rate (−Δt/Δt) is greater than the second current reduction rate (B), the control mode of the engine 10 may be changed to a deceleration rate control mode driving operation S6, which is one of the mode changing operations.

As shown in FIG. 2, the deceleration rate control mode driving operation S6 corresponds to a control mode of the engine 10 when the load of the generator 21 rapidly decreases. Specifically, it may be seen as a case in which the load of the generator 21 does not rapidly decrease compared to the case of the stop mode, but decreases faster than a normal range. In the deceleration rate control mode, the controller 40 may increase the stored maximum deceleration rate (Max(−Δ$\dot{m}_f$/Δt)) of the engine 10 from N (Normal) as follows.

$$\text{Max}\left(-\frac{\Delta \dot{m}_f}{\Delta t}\right) = \text{Normal} + \alpha$$

Here, α is a positive number, and therefore, the maximum deceleration rate of the engine 10 in the deceleration rate control mode has a larger value than in other modes. For example, $\dot{m}_f$ may be a fuel flow rate supplied to the engine 10, and in this case, $-\Delta\dot{m}_f$ may be a reduced amount of the fuel flow rate. Subsequently, over-rotation of the engine 10 may be prevented by continuously determining the torque reduction rate and the current reduction rate.

The idle mode driving step operation S5 or the deceleration rate control mode driving operation S6 may be selectively applied, which may be automatically or manually performed. Furthermore, the idle mode driving operation S5 and the deceleration rate control mode driving operation S6 may be simultaneously applied. However, when the idle mode driving operation S5 and the deceleration rate control mode driving operation S6 are simultaneously applied, because the deceleration rate control mode is related to a control set value for controlling the engine 10 rather than the engine 10 itself, over-rotation of the engine 10 may be prevented due to the effect of the idle mode before the deceleration rate control mode is applied to take effect.

According to the embodiments of the disclosure as described above, various effects including the following effects may be expected. Thus, the disclosure has the following effects.

A hybrid engine system and a method of controlling the hybrid engine system, according to embodiments of the disclosure, are used to control an engine by measuring a torque reduction rate and a current reduction rate. Therefore, compared to the feedback control of an engine based only on the number of rotations of an existing engine, it is possible to predict over-rotation of the engine in advance and perform feed-forward control, thereby preventing over-rotation of the engine in advance, and thus, the disclosure has the effect of preventing damage to the engine and prolonging the lifespan thereof.

In addition, in the disclosure, the engine is controlled in a stop mode in which the engine is stopped and then restarted when the torque reduction rate and the current reduction rate are very large, and when the torque reduction rate and the current reduction rate are relatively large, the engine is controlled in an idle mode in which the engine is idled or in a deceleration rate control mode in which the maximum deceleration rate is increased. That is, by controlling the engine or the engine controller according to the magnitudes of the torque reduction rate and the current reduction rate, it is possible to effectively cope with the situation.

While embodiments have been described with reference to the accompanying drawings, the embodiments are merely examples. It will be understood by those of ordinary skill in the art that various modifications and equivalent other embodiments may be made without departing from the spirit and scope of the disclosure. The spirit and scope of the disclosure should be defined by the following claims.

Specific techniques described in embodiments are merely examples and do not limit the technical scope of the embodiments. In order to concisely and clearly describe embodiments of the disclosure, descriptions of general techniques and configurations of the related art may be omitted. Furthermore, line connections or connection members between elements depicted in the drawings represent functional connections and/or physical or circuit connections by way of example, and in actual applications, they may be replaced or embodied with various additional functional connections, physical connections, or circuit connections. In addition, elements described without using terms such as "essential" and "important" may not be necessary for constituting embodiments of the disclosure.

An element referred to with the definite article or a demonstrative determiner may be construed as the element or the elements even though it has a singular form. Unless otherwise defined, the ranges defined herein are intended to include any embodiment to which values within the ranges are individually applied and may be considered to be the same as individual values constituting the ranges in the detailed description of the embodiments. Operations of a method may be performed in an appropriate order unless explicitly described in terms of order or described to the contrary. Operations of a method are not limited to the stated order thereof. In addition, examples or exemplary terms (for example, "such as" and "etc.") are used for the purpose of description and are not intended to limit the scope of the disclosure unless defined by the claims. Also, those skilled in the art will readily appreciate that many alternations, combinations, and modifications may be made according to design conditions and factors within the scope of the appended claims and their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A hybrid engine system comprising:
   an engine;
   a generator driven by the engine and configured to output electrical energy;
   a battery configured to store the electrical energy produced by the generator or supply the electrical energy together with the generator; and
   a controller configured to control the engine,
   wherein the controller includes a torque meter configured to measure a torque of an output shaft of the engine and a current meter configured to measure an output current of the generator, and the controller is further configured to change a control mode of the engine when a reduction rate of at least one of the torque and the current is greater than a set value while the engine is operating in a fly mode.

2. The hybrid engine system of claim 1, wherein the controller is further configured to drive the engine in a stop mode in which the engine is stopped for a set time when a reduction rate of the torque is greater than a first torque reduction rate or a reduction rate of the current is greater than a first current reduction rate.

3. The hybrid engine system of claim 2, wherein the controller is further configured to idle the engine after the set time has elapsed in the stop mode and then drive the engine in the fly mode.

4. The hybrid engine system of claim 1, wherein the controller is further configured to drive the engine in an idle mode in which the engine is idled for a set time when a reduction rate of the torque is greater than a second torque reduction rate or a reduction rate of the current is greater than a second current reduction rate.

5. The hybrid engine system of claim 1, wherein the controller is further configured to drive the engine in a deceleration rate control mode in which a set value of a maximum deceleration rate of the engine is increased when a reduction rate of the torque is greater than a second torque reduction rate or a reduction rate of the current is greater than a second current reduction rate.

6. A method of controlling a hybrid engine system, the method comprising:
   a fly mode driving operation of driving an engine in a fly mode;
   a reduction rate determination operation of measuring torque of an output shaft of the engine and output current of a generator connected to the output shaft of the engine and comparing a reduction rate of the torque and a reduction rate of the current with a set value; and
   a mode change operation of changing a control mode of the engine according to the reduction rate determination operation.

7. The method of claim 6, wherein the reduction rate determining operation includes a first reduction rate determination operation of comparing the reduction rate of the torque with a first torque reduction rate and comparing the reduction rate of the current with a first current reduction rate, wherein, when the reduction rate of the torque is greater than the first torque reduction rate or the reduction rate of the current is greater than the first current reduction rate, the control mode is changed, in the mode change operation, to a stop mode in which the engine is stopped for a set time.

8. The method of claim 7, wherein the engine is idled after the set time has elapsed in the stop mode and then is driven in the fly mode.

9. The method of claim 7, wherein the reduction rate determination operation includes a second reduction rate determination operation of comparing the reduction rate of the torque with a second torque reduction rate and the reduction rate of the current with a second current reduction rate when, in the first reduction rate determination operation, the reduction rate of the torque is not greater than the first torque reduction rate and the reduction rate of the current is not greater than the first current reduction rate, wherein, when the reduction rate of the torque is greater than the second torque reduction rate or the reduction rate of the current is greater than the second current reduction rate, the control mode is changed, in the mode change operation, to an idle mode in which the engine is idled for a set time.

10. The method of claim 7, wherein the reduction rate determination operation includes a second reduction rate determination operation of comparing the reduction rate of the torque with a second torque reduction rate and the reduction rate of the current with a second current reduction rate when, in the first reduction rate determination operation, the reduction rate of the torque is not greater than the first torque reduction rate and the reduction rate of the current is not greater than the first current reduction rate, wherein, when the reduction rate of the torque is greater than the second torque reduction rate or the reduction rate of the current is greater than the second current reduction rate, the control mode is changed to a deceleration rate control mode in which a set value of a maximum deceleration rate of the engine is increased.

11. The method of claim 6, wherein the reduction rate determination operation includes a second reduction rate determination operation of comparing the reduction rate of the torque with a second torque reduction rate and comparing the reduction rate of the current with a second current reduction rate, wherein, when the reduction rate of the torque is greater than the second torque reduction rate or the reduction rate of the current is greater than the second current reduction rate, the control mode is changed, in the mode change operation, to an idle mode in which the engine is idled for a set time.

12. The method of claim 6, wherein the reduction rate determination operation includes a second reduction rate determination operation of comparing the reduction rate of the torque with a second torque reduction rate and comparing the reduction rate of the current with a second current reduction rate, wherein, when the reduction rate of the torque is greater than the second torque reduction rate or the reduction rate of the current is greater than the second current reduction rate, the control mode is changed to a deceleration rate control mode for increasing a set value of a maximum deceleration rate of the engine.

\* \* \* \* \*